(12) United States Patent
Eaton et al.

(10) Patent No.: US 6,972,692 B2
(45) Date of Patent: Dec. 6, 2005

(54) METHOD AND DEVICE FOR INCREASING EFFECTIVE RADIATED POWER FROM A SUBSCRIBER DEVICE

(75) Inventors: Eric T. Eaton, Lake Worth, FL (US); Salvador Sibecas, Lake Worth, FL (US); Glafkos Stratis, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 108 days.

(21) Appl. No.: 10/423,751

(22) Filed: Apr. 25, 2003

(65) Prior Publication Data

US 2004/0212515 A1    Oct. 28, 2004

(51) Int. Cl.[7] .................................................. G08C 25/00
(52) U.S. Cl. .................. 340/870.07; 600/301; 343/718
(58) Field of Search .................... 340/572.7, 572.8, 340/539.26, 539.22; 343/718, 745; 455/24, 455/41.1, 501, 62, 63.1

(56) References Cited

U.S. PATENT DOCUMENTS

| 5,465,098 | A | * | 11/1995 | Fujisawa et al. ............ 343/718 |
| 6,078,292 | A | | 6/2000 | Koyanagi et al. |
| 6,242,915 | B1 | | 6/2001 | Hurd |
| 6,716,165 | B1 | * | 4/2004 | Flanders et al. ............ 600/301 |
| 6,721,548 | B1 | * | 4/2004 | Mohindra et al. ....... 455/234.1 |
| 6,773,159 | B2 | * | 8/2004 | Kim et al. .................. 374/122 |
| 2002/0165458 | A1 | | 11/2002 | Carter et al. |

* cited by examiner

Primary Examiner—Michael Horabik
Assistant Examiner—Hung Dang

(57) ABSTRACT

A subscriber device (10) includes one or more sensors (102) for measuring a object electromagnetic characteristic, such as conductivity, permittivity or permeability. A controller (104) stores the object electromagnetic parameter in memory (106) and, operating in accordance with a performance enhancement routine stored in the memory (106), enhances operation of the subscriber device (10) in accordance with the electromagnetic parameter. The controller (104) may do this by adjusting the power of an amplifier (112), the frequency of a synthesizer (114) or the impedance of an antenna (110). A software program controlling the subscriber device and a corresponding method are described.

30 Claims, 4 Drawing Sheets

METHOD AND DEVICE FOR INCREASING EFFECTIVE RADIATED POWER FROM A SUBSCRIBER DEVICE

FIELD OF THE INVENTION

The present invention relates generally to subscriber devices, and, more particularly, to a subscriber device with an improved effective radiated power.

BACKGROUND OF THE INVENTION

Conventional subscriber devices are designed in accordance with predetermined human body factors and according to regulatory agency requirements. For example, one approach is for a subscriber device manufacturer to statically set various radio frequency parameters, such as output power from a power amplifier and antenna matching network impedances and the like, thus estimated power levels at expected transmission and reception frequencies in accordance with average electromagnetic properties of the human body. Another approach is for the subscriber device manufacturer to include a sensor for determining if the subscriber device is on or off the human body and a controller for adjusting the antenna based upon this determination.

Both of these approaches fail to properly take into account variations of actual electromagnetic properties of object or body compositions. This will become even more important as system operating frequencies increase and thus wavelengths decrease in future communication technologies. Further, these approaches fail to properly take into account variations in different portions of the human body and the effect of those variations on the radiation pattern of the subscriber device.

BRIEF DESCRIPTION OF THE DRAWINGS

The accompanying figures, in which like reference numerals refer to identical or functionally similar elements and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

In overview, the present disclosure concerns subscriber devices or wireless communications units for facilitating wireless communication. The present disclosure further concerns a methodology for enhancing the effective radiated power of the subscriber device. Note that subscriber device or unit may be used interchangeably herein with wireless device or unit and each of these terms denotes a device ordinarily associated with a user and typically a wireless device that may be used with a public network in accordance with a service agreement or within a private network, or a wireless device that may be used within a body area network (local area network where the local area is the body and immediate vicinity of an individual).

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued. It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in integrated circuits (ICs) such as a digital signal processor or application specific ICs. It is expected that one of ordinary skill, notwithstanding possibly significant effort and many design choices motivated by, for example, available time, current technology, and economic considerations, when guided by the concepts and principles disclosed herein will be readily capable of generating and programming such ICs with minimal experimentation. Therefore, in the interest of brevity and minimization of any risk of obscuring the principles and concepts according to the present invention, further discussion of such ICs and programs, if any, will be limited to the essentials with respect to the principles and concepts used by the preferred embodiments.

Figure 1:
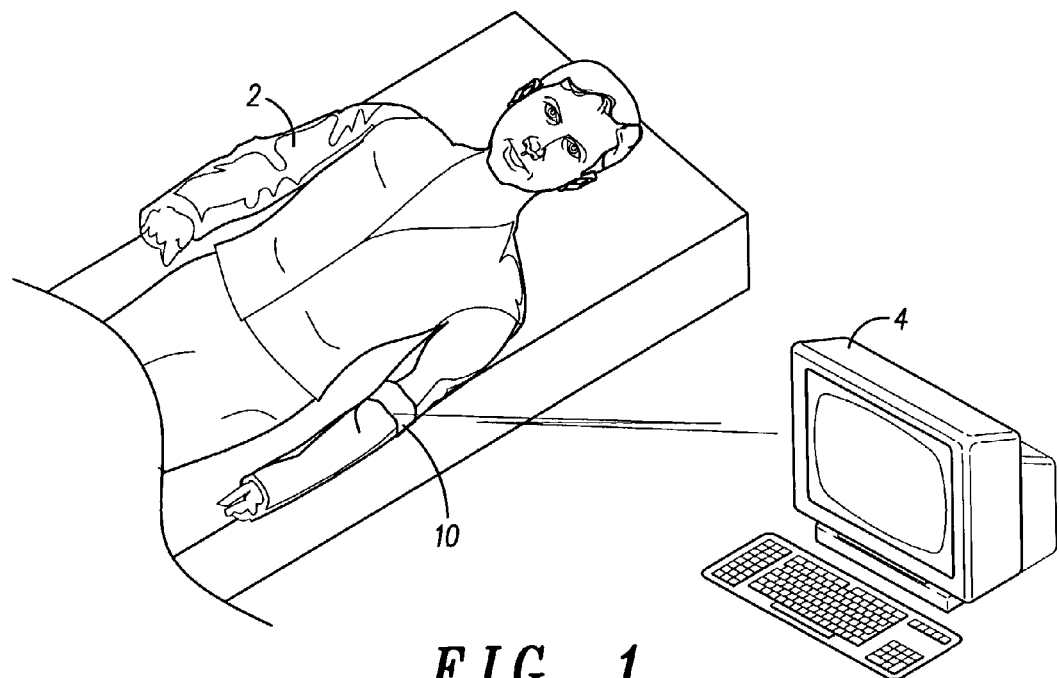
FIG. 1 depicts, in a simplified and representative form, an exemplary environment in which the present invention may be implemented.
Figure 2:
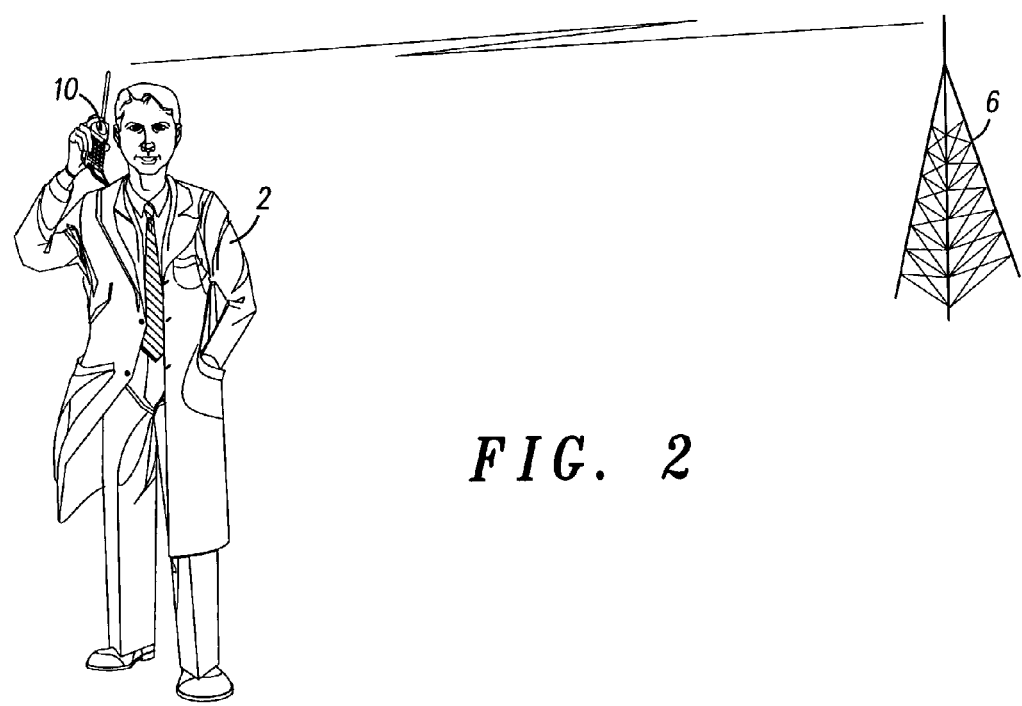
FIG. 2 depicts, in a simplified and representative form, another exemplary environment in which the present invention may be implemented.

As further discussed below, various inventive principles and combinations thereof are advantageously employed to enhance the effective radiated power of a subscriber device. Referring now to FIG. 1, the method and apparatus of the present invention may be implemented within a personal area body network in which, for example, a subscriber device 10 monitors the heart rate and/or other medical related parameters of a human 2. The subscriber device 10 has a wireless connection with a remote terminal or server 4 so that the heart rate can be monitored thereat. Referring to FIG. 2, the present invention may also be implemented within a subscriber device 10 that provides a user 2 with wireless access to a base station 6 to thereby provide the user with access to a telephone access network such as the PSTN (not shown). The subscriber device 10 of both environments may be, for example, the Model 195CL manufactured by Motorola, Inc. of Schaumburg, Ill.

As those skilled in the art should appreciate, various electromagnetic characteristics, such as conductivity, the relative permittivity $\epsilon_r$, or permeability of an object such as that of the body of the human (human body) 2 can affect the effective radiated power of the subscriber device 10. This is because when a dielectric material is brought into close proximity of an unshielded radio frequency (RF) device, such as a subscriber device antenna 110 (shown in FIG. 3), it will interact with the normal free space radiation pattern of the antenna to create a composite antenna radiation pattern, which is a combination of the RF device and the human body radiating the energy. This composite antenna pattern now takes on a radiation pattern.

This new radiation pattern, i.e. composite pattern, is a result of the initial current distribution on the antenna in combination with the induced (by the initial antenna currents) current distribution on the object or the human body. Both current distributions, specifically the initial and the induced currents on the object, now give a new resultant radiation pattern. This distorted radiation pattern or distorted antenna radiation power pattern is dependent on the impact of the object, such as the human body in absorbing and reflecting some of the radiated power depending on the permittivity of the material that is coupling with or coupled to the subscriber device. Also, because the human body 2 has its own impedance or effective impedance, the human body 2 will increase the radiation resistance and resultantly change the antenna efficiency by changing the antenna's impedance. However, different portions of an object or the body react differently according to their electromagnetic properties or characteristics and thus have different effects on the radiation power pattern. For example, muscle has a relative permittivity of 51.6 and a conductivity of 1.56 while fat has a relative permittivity of 5.6 and a conductivity of 0.095. The balance of these discussions will be largely devoted to characteristics of the human body and effects thereof, though it is understood that other objects can have similar characteristics and, etc.

Figure 5:
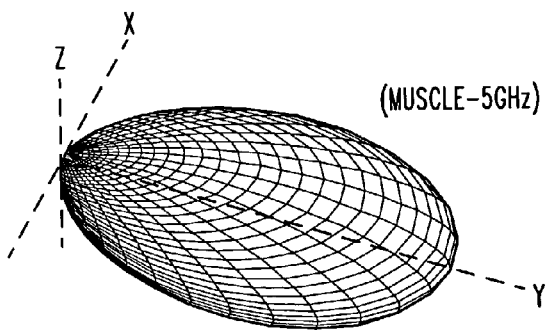
FIGS. 5 and 7 are illustrations of power patterns of radiation that result from an antenna encountering a muscle of a human.
Figure 6:
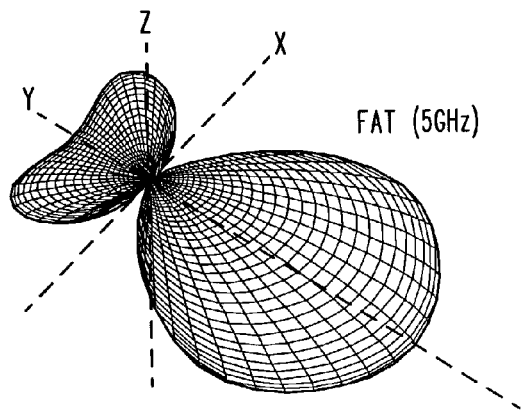
FIGS. 6 and 8 are illustrations of power patterns of radiation that result from an antenna encountering fat of a human.

As is known in the art the free space radiation pattern of an antenna placed at the intersection of the xyz axis and lying along the z axis is omni directional, resembling or having a donut shape with the center of the donut or pattern at the intersection of the xyz axis and the body of the donut intersected by and co-planer with the xy plane. The free space radiation pattern will have equal power densities at equal radii from the z axis at all angles for any plane that is co-planer with the xy plane. In comparison, referring to the signal pattern of FIG. 5, when a signal is transmitted from the subscriber device antenna at a frequency of 5 GHz and the antenna is proximate to a muscle on the human body substantially all of the radiated energy of the signal from the subscriber device antenna is reflected off of the muscle, generally along the positive y axis. The intersection of the axis defines the beginning of the human body. In comparison, as shown in FIG. 6, when a signal is transmitted from the subscriber device antenna at the same frequency when the antenna is proximate to fat on the human body, a portion of the radiated energy penetrates the fat and the beam along the positive y axis is much broader and the effective radiated power along and in the vicinity of the positive y axis is lower than at the same point for the pattern of FIG. 5.

Furthermore the impedance or effective impedance of the antenna or radiating antenna is also affected by the proximity of other materials, such as specifically the human body. The subscriber device typically has impedance matching networks (116) that are tuned or adjusted to match or translate the output impedance of the transmitter to the expected impedance of the antenna. However when the antenna is proximate to a human body that varies from the average human body or the nominal human body characteristics that were used for the nominal design of the matching circuits, the combination of the antenna and the impedance of the body can create or result in a new and unpredicted, indeed unpredictable, impedance. In order to maintain radiated energy efficiency, the radio frequency circuits, such as power amplifier and receiver front end amplifier, must be impedance matched to the unpredicted antenna impedance in order to avoid unnecessary loses in the radiated energy due to impedance mismatches.

Figure 7:
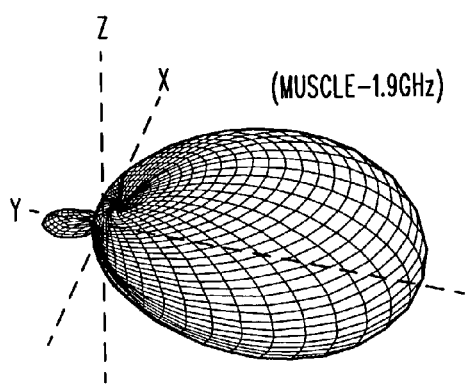
Figure 8:
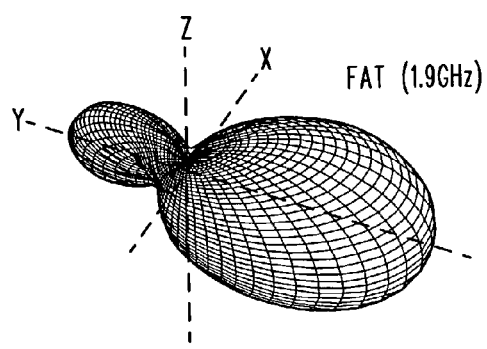

The transmission frequency will also affect the composite radiation pattern and thus the radiation efficiency of the human body together with the antenna. For example, referring to the signal pattern of FIG. 7, when the signal is transmitted from the subscriber device antenna at a frequency of 1.9 GHz and the antenna is proximate to a muscle on the human body a small portion of the radiated energy penetrates the muscle. In comparison, as shown in FIG. 5, substantially all of the radiated energy is reflected off of the human body (muscle) when the signal is transmitted at 5 GHz. Referring to the signal pattern of FIG. 8, when the signal is transmitted at 1.9 GHz and the antenna is proximate to fat on the human body, a smaller portion of the radiated energy penetrates the fat than when the radiated energy was transmitted at the higher frequency as shown in FIG. 6. Therefore, the frequency of the transmission can be changed or varied to increase the amount of radiated energy or effective radiated power from the composite antenna comprising the subscriber device antenna and the human body or particular portion of the human body. Also, the power of the signal can be increased or decreased to take into account the radiation pattern of the composite antenna and thus effective radiated energy according to the human's fat or muscle content. The subscriber device 10 could also be moved to a different portion of the human body 2 such as, for example, a portion with more muscle content so that the signal can be transmitted in a desired pattern or as noted above, for example, the signal may be transmitted at a lower frequency.

Figure 3:
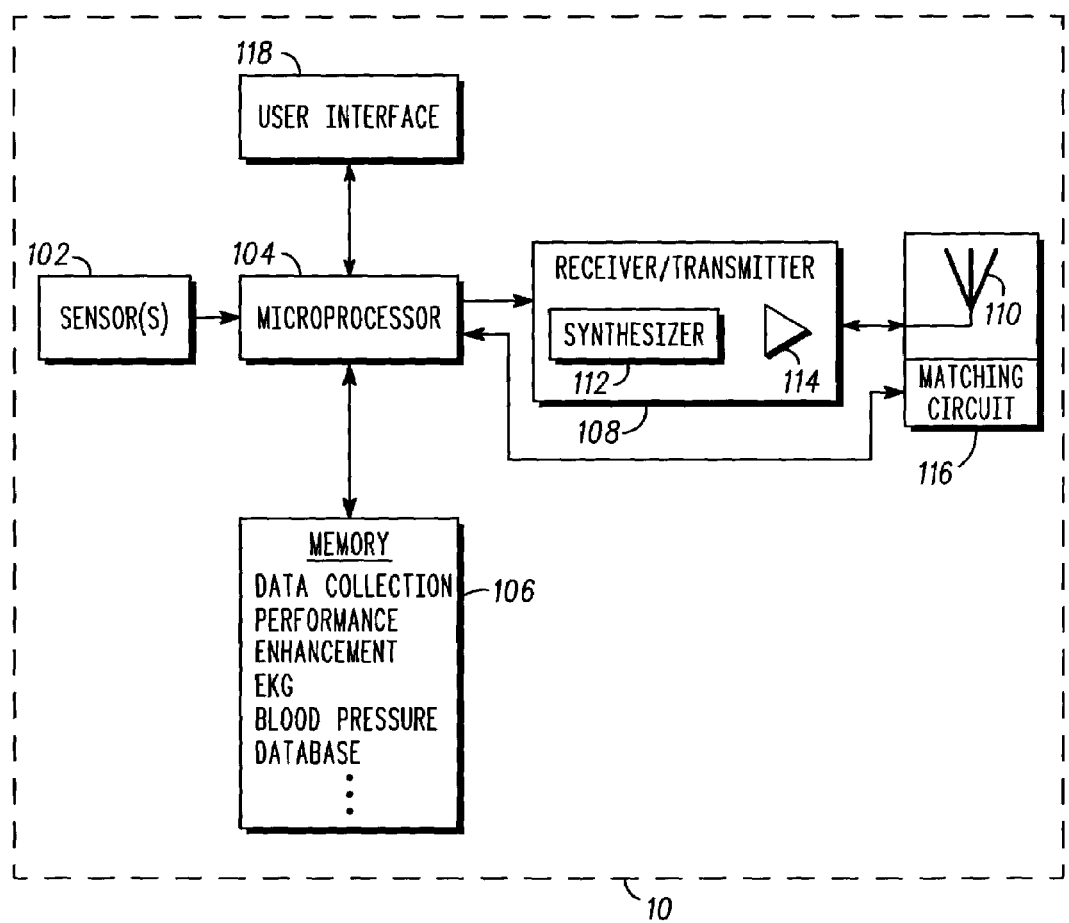
FIG. 3 illustrates a block diagram of components of the subscriber device that are most pertinent to the present invention.

The subscriber device 10 will now be discussed and described with reference to the block diagram of FIG. 3. The subscriber device 10 includes or alternatively can be coupled at an input to one or more sensors 102 for measuring electromagnetic characteristics, such as the relative permittivity, conductivity, or permeability of an object or operator or user, which is preferably a human 2 and for generating an electromagnetic parameter such as an object conductivity, permittivity, or permeability parameter, body conductivity, permittivity, or permeability parameter, or resultant body conductivity, permittivity, or permeability parameter. The sensors 102 may be conventional electromagnetic properties sensors or biosensors such as or similar to the Bodystat® 1500 available from Bodystat Ltd. that determine the percent body fat by measuring the relative permittivity or body conductivity by performing bio-electric impedance analysis, near infrared interactance or total body electrical conduction. Further, if the subscriber device 10 is for a personal body area network, the sensors 102 may also be for measuring the blood pressure and/or the heart rate as well as other known medical related parameters.

The subscriber device 10 also includes a controller 104 that is preferably a general-purpose processor such as an HC11 family microprocessor available from Motorola, Inc. The controller 104 will operate to encode, decode, store and retrieve the information measured by the sensors 102 and to control the transceiver 10, antenna 110, and matching circuit 116 in accordance with software routines or programs stored in a memory source 106 that may be a combination of known RAM, ROM, EEPROM or magnetic memory.

The memory source 106 is used to store among various other items or programs etc., a data collection routine for obtaining and storing the electromagnetic parameters, such as object conductivity, permittivity, or permeability parameters or body conductivity parameters and a performance enhancement routine for enhancing performance of the transceiver 108 and the antenna 110 in accordance with such parameters. Much of the balance of this disclosure will use body conductivity parameters or values and the like but it is understood that such use applies generally to electromagnetic characteristics, parameters, or properties, including, for example conductivity, permittivity, or permeability parameters for objects such as a human body or other materials. The memory source 106 will include one or more databases of preferred signal powers, frequencies, and impedances cross-referenced to body conductivity values. The one or more databases will provide look up tables for the performance enhancement routine. Further, if the subscriber device 10 is for a personal body area network, the memory source 106 may also include routines for processing and displaying the measured medical related parameters such as the blood pressure, heart rate and etc. The data collection routine, the performance enhancement routine and others routines as well as the database are in machine readable code or software instructions that when executed or utilized by the controller 104 included therewith will result in the controller 104 performing the requisite functions of the subscriber device 10 such as interfacing with the transceiver 108 and antenna 110 as well as other possible components for effecting a user interface such as a speaker or display depicted generally by 118. The reader will appreciate that this listing is merely a brief listing of exemplary routines that will be required or advantageous for enhancing the effective radiated power of the subscriber device 10 and that other routines or optional applications may be stored in the memory source 106 that have not been mentioned.

The subscriber device 10 also includes a transceiver 108 for sending and receiving information to and from, for example, a remote terminal 4 or a remote base station 6. The transceiver 108 may be, for example, a BDM2033KFB from Broadcom, Inc. and includes an amplifier and a power amplifier 112 for, respectively amplifying the received or transmitted signal and a synthesizer 114 for controlling the transmission and reception frequency as is known. The transceiver 108 operates with and is controlled by the controller 104 to provide to, or accept or receive via an antenna 110, voice traffic or data messages or signals corresponding thereto and to adjust the power level of the power amplifier 112 or adjust the frequency of the synthesizer 114.

The subscriber device 10 includes the antenna 110 that operates to receive and radiate radio frequency signals that are received or transmitted or sent from or by the transceiver 108 of the subscriber device 10 as is known. The antenna 110 includes a matching circuit 116 with a control input for tuning the antenna 110 to provide impedance matching between the transceiver 108 and the antenna 110. The matching circuit 116, specifically control input is preferably directly coupled to the controller 104 so that the controller 104 can further adjust the impedance of the antenna 110 in accordance with the body conductivity parameter. As mentioned earlier, the human body 2 may change the impedance of the antenna 110.

Figure 4:
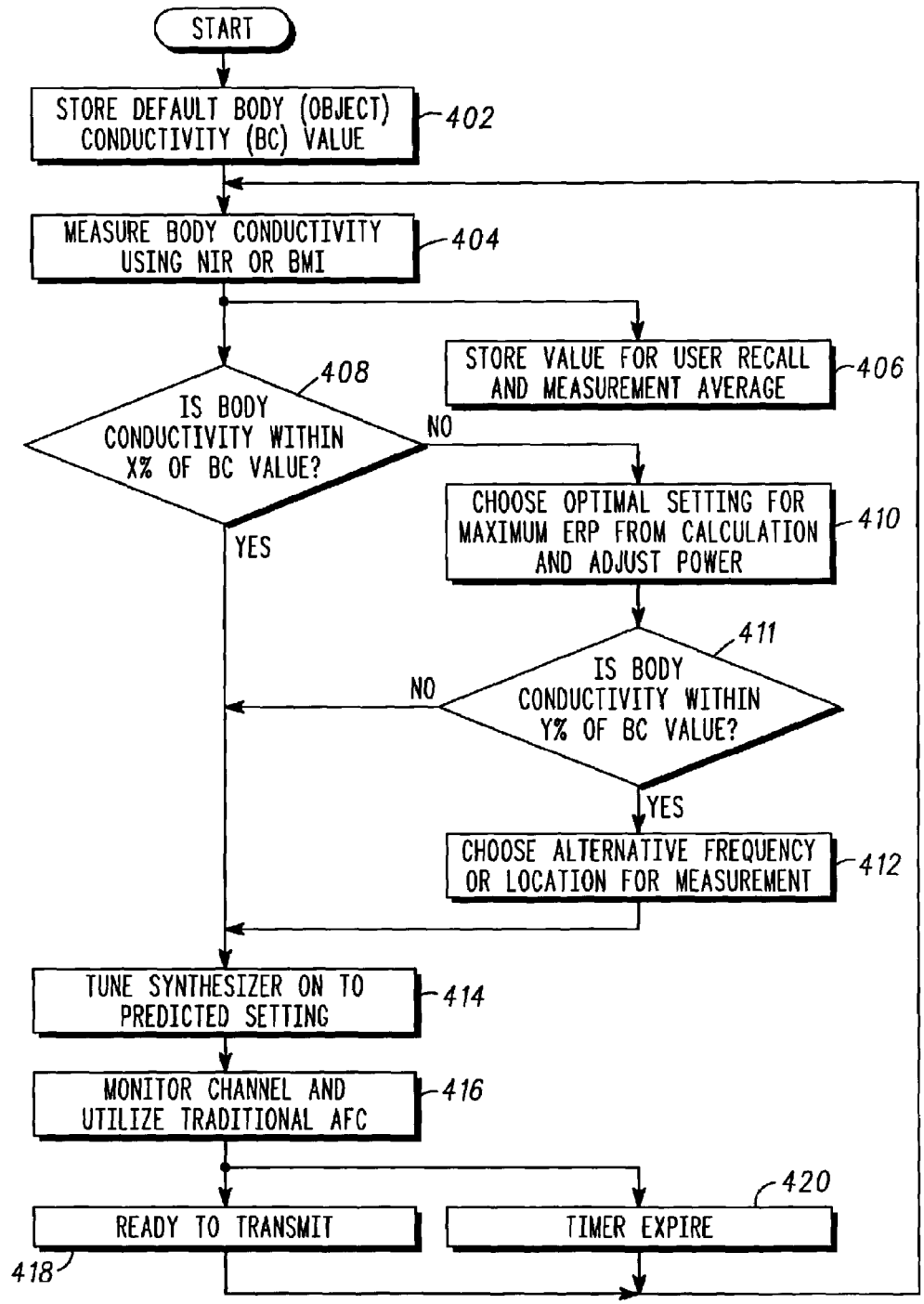
FIG. 4 illustrates a flow chart of the performance enhancement process performed by the subscriber device.

Referring to FIG. 4, an exemplary methodology or process 400 for enhancing the effective radiated power of the subscriber device will now be discussed in view of the elements illustrated in FIG. 1–3 based on conductivity parameters. At 402, a default body conductivity value (or predetermined value) is stored within the memory source 106. The default body conductivity value may be, for example, the relative permittivity or conductivity of the average human that was stored in the memory source 106 at the time of manufacturing the subscriber device 10. At 404, the sensors 102 measure the body conductivity of the human 2 and generate a body conductivity parameter. The sensors 102 measure the body conductivity by, for example, performing bioelectric impedance analysis, near infrared interactance or total body electrical conduction. Preferably, bioelectric impedance analysis or near infrared interactance is used. At 406, the controller 104 stores the body conductivity parameter in the memory source 106 in accordance with the data collection routine.

At 408, the controller 104, operating in accordance with the performance enhancement routine, compares the body conductivity parameter with the default body conductivity value (or predetermined value) and generates a resultant comparison parameter. More particularly, the controller 104 determines if the body conductivity parameter is greater or less than the default body conductivity value by a predetermined percentage (or predetermined amount). For example, if the default body conductivity value is 1, the body conductivity parameter is 1.46 and the predetermined percentage was 10, the controller 104 would generate a resultant comparison parameter that includes the Boolean value True. The resultant comparison parameter may also include the difference between the body conductivity parameter and the default body conductivity value.

If, at 408, the controller 104 determines that the body conductivity parameter is greater or less than the default body conductivity value by more then the predetermined percentage, (resultant comparison parameter includes the Boolean value True) then at 410 the controller 104 will determine the preferred settings for enhancing the performance of the transceiver 108 based upon the resultant comparison parameter. More particularly, the controller 104 will determine the optimum signal power to be used based upon the resultant comparison parameter or determine the optimum impedance for the antenna 110 so that the antenna's impedance is matched to the impedance of the transceiver 108. This may be done by utilizing one of the look up tables provided by the databases stored in the memory source 106 to determine the adjustment amount based upon the resultant comparison parameter. Alternatively an algorithm can be experimentally developed used to determine the adjustment amount. The controller 104 subsequently adjusts the power amplifier 112 and antenna 110 according to the determined optimal signal power and impedance.

At 411, the controller 104 determines if the body conductivity parameter differs from the default body conductivity value by more than a second predetermined percentage (another predetermined amount) and generates another resultant comparison parameter. The second predetermined percentage is higher than the predetermined percentage utilized in the comparison of 408. If, at 411, the controller 104 determines that the body conductivity parameter is greater or less than the default body conductivity value by the second predetermined percentage, then at 412 the controller 104 will determine an alternate transmission or reception frequency for adjusting the synthesizer 114 to thereby adjust the transmission frequency of the transceiver 108. Again this can be done by utilizing the look up table. Optionally, the controller 104 may determine that an alternate location on the human body 2 will provide a better effective radiated power.

At 414, the controller 104 will tune the synthesizer 114 to the settings determined at 410 and at 412 (if the body conductivity parameter differs from the default body conductivity value by more than a second predetermined percentage) or generate a signal indicative of a command to adjust the location of the subscriber device 10 if so determined at 412. If, at 408 the controller 104 determines that the body conductivity parameter is not greater or less than the default body conductivity value by the predetermined percentage, then the process 400 proceeds directly to 414 and the synthesizer 114 or the power amplifier 112 will be adjusted in accordance with the default body conductivity value. Also, if, at 411, the controller 104 determines that the body conductivity parameter is not greater or less than the default body conductivity value by the second predetermined percentage, then the process also proceeds directly to 414 and the synthesizer 114 and the power amplifier 112 will be adjusted in accordance with the default body conductivity value.

At 416, the controller 104 will monitor the channel frequency and utilize traditional automatic gain control and automatic frequency control to maintain the channel as is known. At 418, the controller 104 commands the transceiver 108 to begin sending and receiving. A timer is maintained by an internal clock for energy conservation purposes. Every time a call or transmission is begun, the timer will be reset. As depicted at 420, the process 400 returns to 404 when the timer expires. The process 400 also returns to 404 after the transceiver 108 finishes sending and receiving information. Of course the process 400 will not return to 404 if the transceiver 108 is s till sending and receiving regardless of the status of the timer. Although this example was based on the conductivity of a body, other electromagnetic properties such as permittivity and permeability can be used in combination with or independently of conductivity in a similar fashion to move through the methodology or process described in FIG. 4.

Therefore, the present invention provides a subscriber device 10 having improved effective radiated power. The subscriber device 10 includes one or more sensors 102 for measuring electromagnetic characteristics of an object, such as a body conductivity parameter of the human body. The subscriber device 10 includes a controller 104 that enhances operation of the subscriber device 10 by adjusting the impedance of the antenna 110, the power of the amplifier 112 or the frequency of the synthesizer 114 in accordance with the electromagnetic properties or parameters. The controller 104 preferably performs the enhancement of the subscriber device 10 in accordance with a software program stored in subscriber device memory. The controller 104 resultantly substantially limits power of the radio frequency signals from the subscriber device 10.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A subscriber device having an improved effective radiated power, the subscriber device comprising:
   a sensor, for measuring an electromagnetic characteristic of an object further comprising a human body and generating an object electromagnetic parameter further comprising measuring a body electromagnetic characteristic of a human and generating a body electromagnetic parameter;
   a transceiver coupled to an antenna for sending and receiving information; and
   a controller, coupled to the sensor and the transceiver, for enhancing performance of the transceiver in accordance with the body electromagnetic parameter.

2. The subscriber device of claim 1, wherein:
   the transceiver further comprises a power amplifier and a synthesizer; and
   the controller is further for adjusting the synthesizer in accordance with the object electromagnetic parameter to thereby adjust a transmission frequency.

3. The subscriber device of claim 2, wherein the controller is further for adjusting the power amplifier in accordance with the object electromagnetic parameter to thereby adjust a power level.

4. The subscriber device of claim 1, wherein the controller is further for generating a signal indicative of a command to adjust a location of the subscriber device in accordance with the object electromagnetic parameter.

5. The subscriber device of claim 1, wherein:
   the controller further compares the object electromagnetic parameter with a predetermined value stored in a memory and generates a resultant comparison parameter; and
   the controller enhances die performance of the transceiver based upon the resultant comparison parameter.

6. The subscriber device of claim 5, wherein:
   the transceiver further comprises a power amplifier and a synthesizer; and
   the controller is further for adjusting the power amplifier to thereby adjust a power level when the object electromagnetic parameter differs from the predetermined value by more than a predetermined amount.

7. The subscriber device of claim 6, wherein the controller is further for adjusting the synthesizer to thereby adjust a transmission frequency when the object electromagnetic parameter differs from the predetermined value by more than another predetermined amount.

8. The subscriber device of claim 6, wherein the controller is further for generating a signal indicative of a command to adjust a location of the subscriber device when the object electromagnetic parameter differs from the predetermined value by more than another predetermined amount.

9. The subscriber device of claim 1, wherein:
   the sensor measures the body electromagnetic characteristic as one of a body conductivity, a body permittivity, and a body permeability by performing one of bioelectric impedance analysis, near infrared interactance and total body electrical conduction.

10. The subscriber device of claim 1, wherein:
    the subscriber device further includes an antenna for receiving and radiating radio frequency signals; and the controller is further for substantially limiting power of the radio frequency signals.

11. The subscriber device of claim 1, wherein:
    the subscriber device further includes an antenna for receiving and radiating radio frequency signals; and the controller is further for adjusting an impedance of the antenna in accordance with the object electromagnetic parameter.

12. The subscriber device of claim 1, wherein:
    the subscriber device further includes a lookup table stored in a memory source, the lookup table including signal powers, frequencies, and impedances associated with respective object electromagnetic values.

13. The subscriber device of claim 1, wherein the electromagnetic characteristic that is measured is one of an object conductivity, an object permittivity, and an object permeability.

14. A method for providing improved effective radiated power for a subscriber device, the method comprising:
measuring an electromagnetic characteristic of an object and generating a object electromagnetic parameter; and
enhancing performance of a transceiver in the subscriber device in accordance with the object electromagnetic parameter,
wherein the enhancing of the performance further comprises generating a signal indicative of a command to adjust a location of the subscriber device when the object electromagnetic parameter differs from a predetermined value by more than a predetermined amount.

15. The method of claim 14, further comprising comparing the object electromagnetic parameter with the predetermined value stored in a memory and generating a resultant comparison parameter.

16. The method of claim 15, wherein the enhancing of the performance further comprises adjusting a power level of the transceiver when the object electromagnetic parameter differs from the predetermined value by more than another predetermined amount.

17. The method of claim 15, wherein the enhancing of the performance further comprises adjusting a transmission frequency of the transceiver when the object electromagnetic parameter differs from the predetermined value by more than another predetermined amount.

18. The method of claim 15, wherein the enhancing of the performance further comprises adjusting an impedance of an antenna of the subscriber device when the object electromagnetic parameter differs from the predetermined value by more than another predetermined amount.

19. The method of claim 14, wherein: the measuring the object electromagnetic characteristic further comprises measuring a body electromagnetic characteristic of an operator of the subscriber device and generating a body electromagnetic parameter, and the enhancing comprises enhancing the performance of the transceiver in accordance with the body electromagnetic parameter.

20. The method of claim 19, wherein the measuring the body electromagnetic characteristic further comprises measuring a body conductivity by one of bio-electric impedance analysis, near infrared interactance and total body electrical conduction.

21. The method of claim 14, wherein the enhancing of performance of the transceiver further comprises obtaining a preferred signal power, frequency or impedance by referring to a lookup table stored in a memory source, the lookup table including signal powers, frequencies, and impedances associated with respective object electromagnetic characteristic values.

22. A software program arranged to provide improved effective radiated power for a subscriber device, the software program when installed and executing on a subscriber device processor resulting in the subscriber device:
measuring an electromagnetic characteristic of an object and generating an object electromagnetic parameter; and
enhancing performance of a transceiver in the subscriber device in accordance with the object electromagnetic parameter,
wherein the enhancing performance of the transceiver further comprises obtaining a preferred signal power, frequency or impedance by referring to a lookup table stored in a memory source, the lookup table including signal powers, frequencies, and impedances associated with respective object electromagnetic parameter values.

23. The software program of claim 22, further comprising comparing the object electromagnetic parameter with a predetermined value stored in a memory and generating a resultant comparison parameter.

24. The software program of claim 23, wherein the enhancing of the performance further comprises adjusting a power level of the transceiver when the object electromagnetic parameter differs from the predetermined value by more than a predetermined amount.

25. The software program of claim 24, wherein the enhancing of the performance further comprises adjusting a transmission frequency of the transceiver when the object electromagnetic parameter differs from the predetermined value by more than another predetermined amount.

26. The software program of claim 23, wherein: the measuring the object further comprises measuring a body conductivity of an operator of the subscriber device and generating a body conductivity parameter and the enhancing comprises enhancing the performance of the transceiver in accordance with the body conductivity parameter.

27. The software program of claim 26, wherein the enhancing of the performance further comprises adjusting an impedance of an antenna of the subscriber device when the body conductivity parameter differs from the predetermined value by more than another predetermined amount.

28. A device comprising:
a sensor, wherein the sensor measures an energy absorption characteristic of an object and generates an object energy absorption parameter;
a transceiver coupled to an antenna for transmitting and receiving information; and
a controller, coupled to the sensor and the transceiver, wherein the controller modifies a performance of the transceiver in accordance with the object energy absorption parameter to adjust an amount of energy absorbed by the object.

29. The device of claim 28 wherein the controller modifies the performance of the transceiver by modifying a transmission frequency of the transceiver.

30. The device of claim 28 wherein the controller modifies the performance of the transceiver to lower the amount of energy absorbed the object.

* * * * *